Jan. 14, 1958        A. J. KOSCH        2,819,777
VEHICLE STEERING AID
Filed March 18, 1953        2 Sheets-Sheet 1
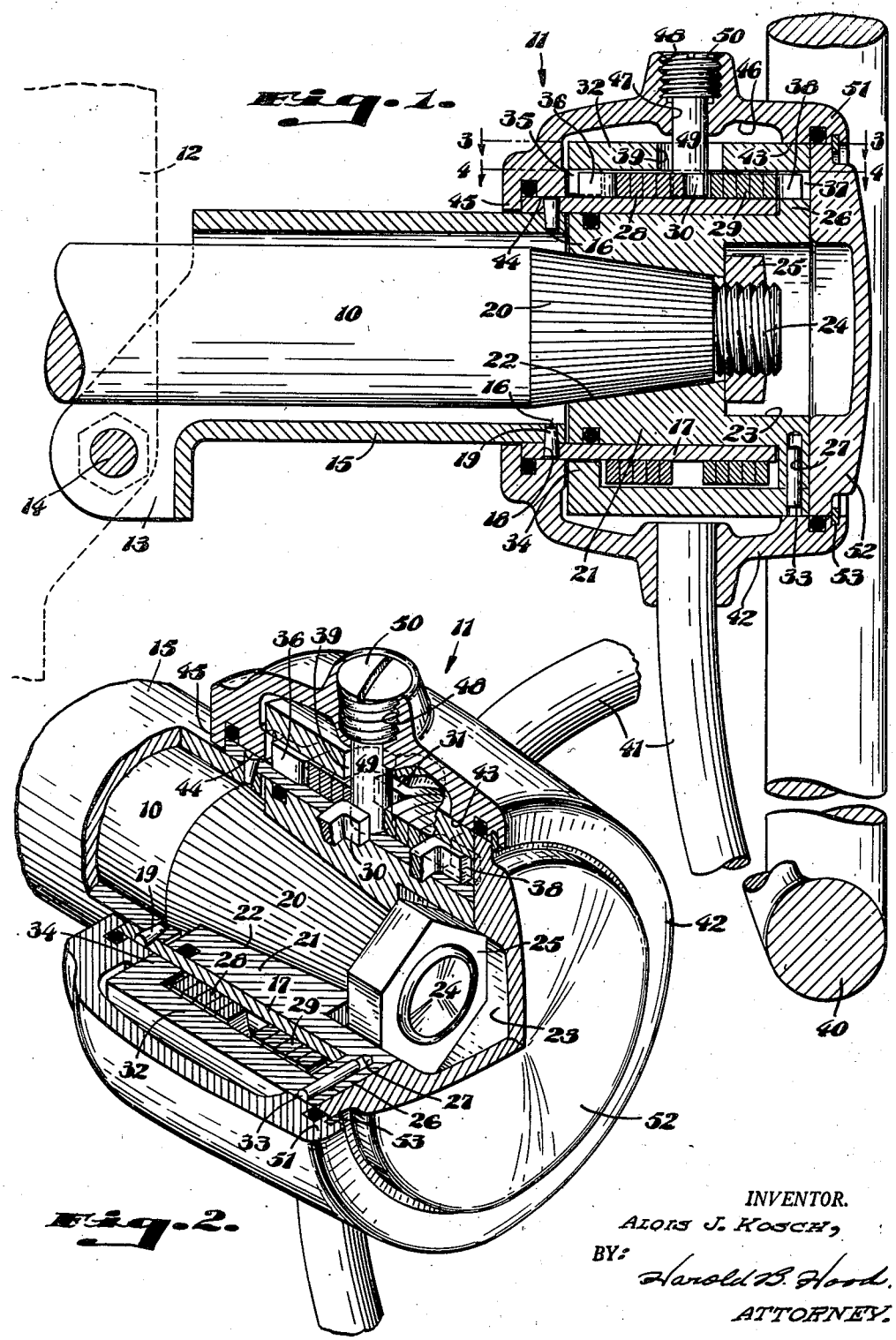
INVENTOR.
ALOIS J. KOSCH,
BY: *Harold B. Hood.*
ATTORNEY.

Jan. 14, 1958  A. J. KOSCH  2,819,777
VEHICLE STEERING AID
Filed March 18, 1953  2 Sheets-Sheet 2
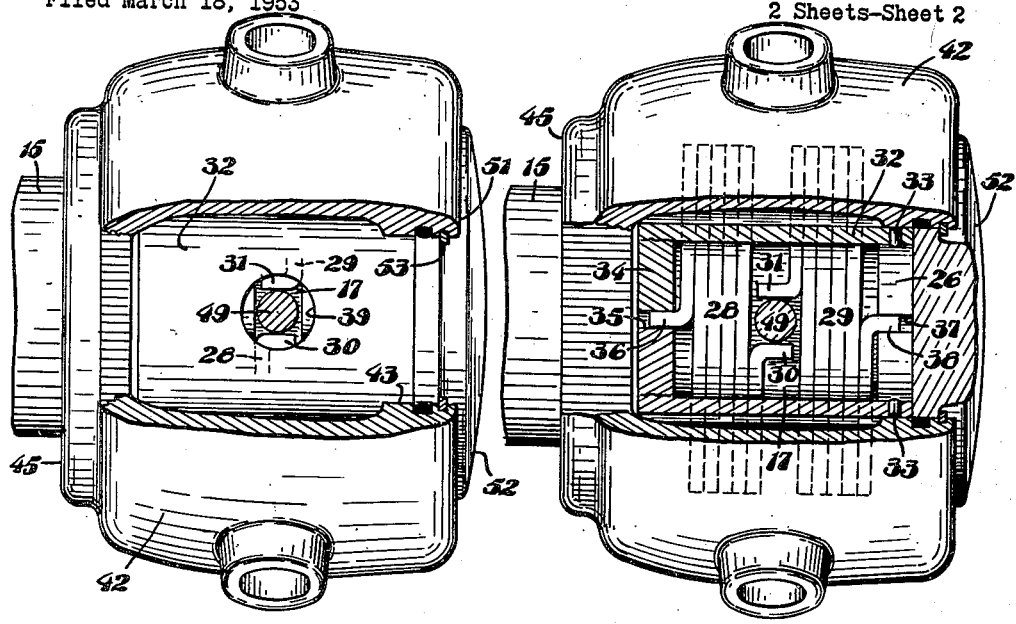
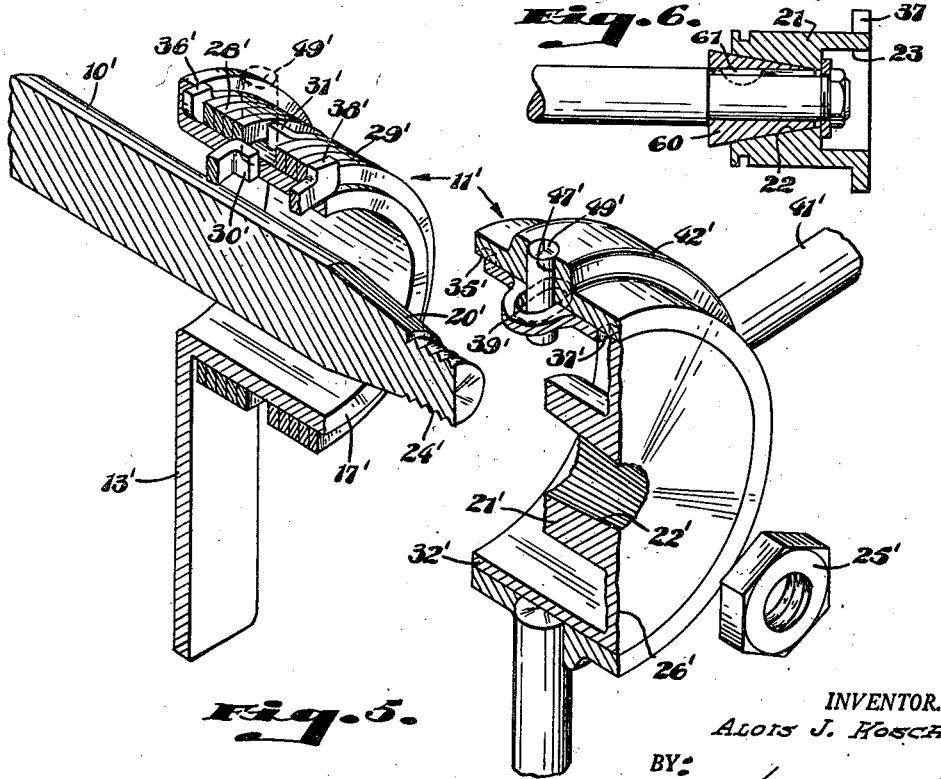
INVENTOR.
ALOIS J. KOSCH,
BY:
Harold B. Hood
ATTORNEY.

United States Patent Office 2,819,777
Patented Jan. 14, 1958

2,819,777

VEHICLE STEERING AID

Alois J. Kosch, Columbus, Nebr., assignor to Kosch Co., Columbus, Nebr., a corporation of Nebraska Application March 18, 1953, Serial No. 343,126

10 Claims. (Cl. 192—8)

The present invention relates to a steering aid for vehicles, and is primarily concerned with the provision of means, readily associable with a conventional steering post of such a vehicle, for preventing the transmission of road shocks to the conventional manually-manipulable steering element of the vehicle.

The invention is primarily useful in the steering systems of farm or military or construction vehicles which must be driven over rough terrain. In driving a wheeled tractor over a plowed field, for instance, when the dirigible wheels strike a furrow or a hummock at an angle, they tend to twist in one direction or the other; and that tendency is transmitted, through a steering post, to the steering wheel, where it must be resisted by the vehicle operator, if the vehicle is to be held substantially to a true course. My invention contemplates means whereby any such tendency is mechanically resisted and absorbed before it reaches the manually manipulable steering element.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a longitudinal, substantially central section through a steering aid constructed in accordance with the present invention, and showing a preferred form thereof;

Fig. 2 is a perspective view of the same embodiment of my invention, parts being broken away for clarity of illustration;

Fig. 3 is a plan view thereof, with certain parts broken away;

Fig. 4 is a similar view with further parts broken away;

Fig. 5 is an exploded view of a simplified embodiment of my invention; and

Fig. 6 is a reduced, fragmentary, sectional view showing the manner in which my steering aid may be adapted to steering posts of different designs.

Referring more particularly to the form of invention illustrated in Figs. 1 to 4, the reference numeral 10 indicates a conventional steering post with which the steering aid of the present invention, indicated generally by the reference numeral 11, may be associated. To any convenient portion 12 of the vehicle, adjacent the steering post, a bracket 13 is fixedly secured by means of one or more bolts 14 or other suitable fastening means. The bracket 13 embodies a tubular shank 15 which substantially coaxially surrounds an upper portion of the steering post 10, and which is preferably provided, adjacent its distal end, with a series of perforations 16 peripherally spaced about the bracket shank 15.

A drum element 17, preferably formed adjacent one end with a corresponding series of perforations 18, has that end sleeved on the distal end of the bracket shank 15 and secured thereto by wedge pins 19 entered in registering perforations 18 and 16. The drum 17 surrounds the distal end portion 20 of the post 10, and is preferably made removable from the bracket 13. Brackets of various sizes and shapes may be substituted, of course, for the particular bracket shown in order to accommodate the device to various specific forms and arrangements of steering posts, as encountered in various makes of vehicles.

A block 21 is formed with an axially-extending socket 22 for mounting upon the portion 20 of the steering post 10. In the illustrated form of the invention, the steering post end 20 and the socket 22 are tapered and are axially serrated to provide the necessary non-rotational connection between the steering post and the block. Preferably, the block 21 will have a rotational bearing within the drum 17.

To accommodate the device to various forms of steering post ends, suitable adapter bushings may be provided, as suggested at 60 in Fig. 6. Each such bushing, of course, will be externally formed to correspond to the socket 22, and will be internally formed to mate with some commercial form of steering post end and to be rotationally fixed thereto as, for instance, by a key 61.

The socket 22 opens into a recess or pocket 23 in the outer end of the block 21; and a threaded section 24 of the steering post 10 projects into said recess, where it receives a nut 25 for locking the block in place on the steering post.

At its outer end, the block 21 is provided with a peripheral flange 26 which overlies the outer end of the drum 17, and which is provided with a peripherally spaced series of sockets 27 for a purpose later to become apparent.

A coiled spring 28 is sleeved on the external surface of the drum 17, said spring being so proportioned and designed that, when in equilibrium, the internal diameter of the coil is slightly less than the external diameter of the drum 17 so that, when said spring is thus mounted on the drum, it has resilient, frictional engagement with the external drum surface. A similar spring 29 is sleeved on the drum, as shown. The two springs are wound in the same direction, and each end of each spring is, in the illustrated embodiment of the invention, turned axially away from the spring body. When the two springs are in proper association on the drum, their adjacent ends 30 and 31 are disposed in mutually-facing relation and are slightly spaced from each other peripherally, as is most clearly illustrated in Figs. 2, 3 and 4.

A sleeve 32 overlies the block 21, having bearing, at its outer end, upon the flange 26, and being secured to said block by pins 33 projected through suitable perforations in the sleeve end and entering the sockets 27. At its inner end, the sleeve 32 is formed to provide a radially-inwardly-projecting flange 34 which preferably bears upon the external surface of the drum 17. As is clearly shown, the sleeve 32 overlies and houses the springs 28 and 29.

The flange 34 is formed at one point with a slot 35 in which the end 36 of the spring 28 is received, whereby said spring end is anchored to the sleeve 32; and the flange 26 of the block 21 is formed, at one point, with a similar slot 37 in which is received the end 38 of the spring 29, whereby said spring end is anchored on said block. It will be seen that, in effect, the block 21 and the sleeve 32 comprise a shell housing the springs 28 and 29, the remote ends 36 and 38 of said springs being anchored on said shell.

The sleeve 32 is formed, at one point in its periphery, with an opening 39 which registers with the space between the adjacent ends 30 and 31 of the springs 28 and 29, the peripheral dimension of said opening exceeding the peripheral space between said spring ends. In the form of invention illustrated in Figs. 1 to 4, the opening 39 is circular.

A steering wheel 40 includes a series of spokes 41 whose inner ends are fixed to a hub 42. Said hub 42 is formed to provide an internal cylindrical surface 43 having bearing on the sleeve 32, and an internal cylindrical surface 44 having bearing on the drum 17 inwardly beyond the inner end of the sleeve 32. Preferably, the hub 42 is formed with a flange 45 approaching the external surface of the bracket shank 15, a chamber 46 being defined between the surfaces 43 and 44.

A radial bore 47, having an internally threaded enlargement 48 at its outer end, opens into said chamber; and a pin 49, having an enlarged head 50, is entered in said bore and projects through the opening 39 and into the space between the adjacent spring ends 30 and 31. As shown, the shank of the pin 49 is cylindrical; and I believe this arrangement to be optimum. Essentially, however, it is only necessary that the dimension of that portion of the pin which is disposed within the opening 39 shall be less, in a peripheral direction, than the peripheral dimension of the opening 39, and that the peripheral dimension of that portion of the pin which is disposed between the spring ends shall be substantially equal to the peripheral spacing between said spring ends 30 and 31.

Preferably, an axially extending portion 51 of the hub 42 is formed to receive a closure cap 52 which may be held in place by a spring ring 53 received in a suitable groove in said hub portion 51. It will be seen that, thus, the hub 42 and the cap 52 cooperate to house and enclose all of the operative mechanism above described.

As indicated above, the springs 28 and 29 normally are in resilient, frictional engagement with the external surface of the drum 17; and that engagement is such as to prevent rotation of either spring relative to the drum. Since the spring ends 36 and 38 are anchored upon the shell 21, 32, the springs act, under these conditions, to hold the shell, and therefore the steering post 10, against rotation.

However, if the steering wheel 40 is turned in either direction, the pin 49 will act upon the end 30 or 31 of one or the other of the springs to tend to unwrap that spring from the drum as the hub 42 turns relative to the sleeve 32. For instance, if the steering wheel is turned in a clockwise direction as viewed in Fig. 2, the pin 49 will move the spring end 31 in a clockwise direction. Since the end 38 of the same spring 29 is fixed with respect to the sleeve 32, such movement of the spring end 31 will tend to unwind the spring 29, thereby relieving its frictional engagement with the drum 17. When the pin 49 engages the right-hand end of the opening 39, it will tend to entrain the sleeve 32; and as said sleeve begins to move, it will carry with it the spring end 36, thus tending to unwind the spring 28. Because of this action upon the two springs, the shell 21, 32, and thus the steering post 10, may be freely turned.

In the same way, if the steering wheel is turned in a counter-clockwise direction, the pin 49 will engage the spring end 30 to tend to unwind the spring 28; and when the pin reaches the left-hand end of the opening 39, the shell 32 will be entrained to unwind the spring 29 by counter-clockwise movement of the spring end 38.

However, with the parts in a condition of equilibrium, if a force exerted upon one of the vehicle wheels is transmitted through the post 10, tending to turn that post in a clockwise direction as viewed in Fig. 2, the tendency will be to move the end 38 of the spring 29 in a clockwise direction, to wrap said spring more tightly about the drum 17; and the frictional engagement of the spring 29 with said drum will hold the shell, and therefore the steering post, against such movement in response to such force. Similarly, any force exerted by the vehicle wheels upon the steering post 10 tending to turn the latter in a counter-clockwise direction will tend to wrap the spring 28 more tightly about the drum 17, whereby such tendency will be resisted.

Thus, it will be seen that, so long as the operator does not exert any turning force upon the steering wheel 40, the steering gear will be positively held in any position of adjustment, against any deflecting forces which may be exerted upon the dirigible vehicle wheels as they encounter obstacles or roughness in the surface being travelled. Nevertheless, no substantial resistance is encountered when the operator exerts a turning force upon the steering wheel 40. It may be noted that, as the operator exerts such a force upon the steering wheel, any force impressed upon the vehicle wheels in the direction in which the operator seeks to turn them will be transmitted in aid of the operator's effort, while any force opposing the operator's effort will be absorbed in the mechanism above described.

In Fig. 5, I have shown a simplified assembly which, in operative function, is the substantial equivalent of that above described. In Fig. 5, I have shown a steering post 10' with which the steering aid 11' of the present invention is to be associated. The bracket 13' is formed to provide an integral drum 17', and is mounted upon a fixed part of the vehicle in such a position that the drum 17' is substantially coaxial with, and surrounds a portion of, the post 10'. As in the previously described embodiment of the invention, the post 10' is shown as formed with a tapered and serrated portion 20' upon which the tapered and serrated socket 22' of a shell 21' is suitably seated, said shell being held in place by a nut 25' turned down upon the threaded portion 24' of the post 10'.

In this embodiment of the invention, the shell 21' includes an integral discoid portion 26' which integrally carries a sleeve portion 32'. Obviously, an adapter of the general character suggested at 60 in Fig. 6 may be used, if required, with this form of the invention, as well.

Springs 28' and 29', in all respects equivalent to the springs 28 and 29, are sleeved on the drum 17' in resilient frictional engagement with the external surface thereof; and their adjacent ends 30' and 31' are disposed in facing, peripherally spaced relation. The sleeve portion 32' of the shell 21' is formed with a notch 35' receiving the end 36' of the spring 28', and with a notch 37' receiving the end 38' of the spring 29', whereby the remote ends of the springs are anchored on the shell.

The sleeve portion 32' is formed with a peripherally elongated opening 39' registering with the space between the spring ends 30' and 31'.

A steering wheel (not shown) includes spokes 41' fixed to a hub 42' which is sleeved on the external surface of the shell 21' for limited relative rotation with respect thereto. The hub 42' is formed with a perforation 47' in which is fixedly mounted a pin 49' passing through the opening 39' to have its inner end disposed in the space between the adjacent spring ends 30' and 31'. Desirably, the diameter of the pin 49' will be equal to the peripheral spacing between the spring ends 30' and 31'.

The operation of the structure illustrated in Fig. 5 is identical with that of the embodiment illustrated in Figs. 1 to 4. Rotational forces exerted upon the steering wheel will be freely transmitted to the steering post 10'; but rotational forces exerted upon the steering post 10' through the vehicle wheels will be absorbed in the disclosed mechanism and will not be transmitted to the hub 42' and thence to the steering wheel.

I claim as my invention:

1. A steering aid for vehicles comprising a drum, means for mounting said drum fixedly on a vehicle in substantial axial alignment with the steering post of the vehicle, a shell adapted for mounting on such a steering post in non-rotational relation thereto and having a portion overlapping said drum exteriorly thereof, a pair of coiled springs sleeved on said drum, said springs being wound in a common direction, the adjacent ends of said springs facing each other and peripherally spaced from each other, the remote ends of said springs being operatively connected to said overlapping portion of said shell, a manually manipulable steering element mounted for rotation upon the axis of said drum, said steering element having a lost-motion rotary connection with said shell, and means fixed with respect to said steering element and positioned between said adjacent ends of said springs, whereby rotational movement of said steering element relative to said shell in one direction or the other causes said last-named means to shift an end of one or the other of said springs to tend to unwrap the same from said drum.

2. A steering aid for vehicles comprising a drum, means for mounting said drum fixedly on a vehicle in substantial axial alignment with the steering post of the vehicle, a shell having a central socket adapted to receive an end of such a steering post, means for restraining said shell against rotation relative to such a post, said shell having a portion axially overlapping, but radially spaced outwardly from, said drum, a pair of coiled springs coaxially sleeved on said drum and normally frictionally engaging said drum, said springs lying between said drum and said overlapping shell portion, said springs being wound in a common direction, having their adjacent ends facing each other in peripherally-spaced relation, and having their remote ends anchored on said shell overlapping portion, a manually manipulable steering element mounted for rotation upon the axis of said drum, said steering element having a lost-motion rotary connection with said shell, and means fixed with respect to said steering element and projecting into, and peripherally filling, the space between said adjacent spring ends.

3. A steering aid for vehicles comprising a drum, means for mounting said drum fixedly on a vehicle in substantial coaxial relation to the steering post of the vehicle, a shell adapted for fixed mounting on such a steering post, a pair of coiled springs coaxially mounted in normally frictional engagement with said drum, said springs being wound in a common direction, having their adjacent ends facing each other in peripherally spaced relation, and having their remote ends anchored on said shell, a manually manipulable steering element mounted for rotation about the axis of said drum, said steering element having a lost-motion connection with said shell, and means moving with said steering element and projecting into the space between said adjacent spring ends, the parts being so proportioned and arranged that, as said steering element is turned, in one direction or the other, it will shift the adjacent end of one spring or the other to tend to retract the same from frictional engagement with said drum, before entraining said shell.

4. A steering aid for vehicles comprising a drum, means for mounting said drum stationarily on a vehicle in substantial coaxial relation to the steering post of such vehicle, a shell adapted to be mounted on such steering post and having a cylindrical portion disposed, when said shell is so mounted to surround said drum in radially-spaced relation to the external surface thereof, said cylindrical portion being provided with an opening therethrough, a pair of coiled springs sleeved on said drum and normally in resilient, frictional engagement with the external surface thereof, said shell cylindrical portion overlying both of said springs, said springs being wound in a common direction and having their adjacent ends disposed in facing relation and peripherally spaced apart by a dimension less than the peripheral dimension of said opening through said shell cylindrical portion, and said springs having their remote ends anchored on said shell, a manually manipulable steering element mounted for rotation about the axis of said drum and having a portion overlying said opening, and a member carried by said steering element, penetrating said opening and having a portion disposed between said adjacent spring ends, the peripheral dimension of that section of said last-named member located within said opening being less than the peripheral dimension of said opening.

5. A steering aid for vehicles comprising a drum, means for mounting said drum stationarily on a vehicle in substantial coaxial relation to the steering post of such vehicle, a shell adapted to be mounted on such steering post and having a cylindrical portion disposed, when said shell is so mounted, to surround said drum in radially-spaced relation to the external surface thereof, said cylindrical portion being provided with an opening therethrough, a pair of coiled springs sleeved on said drum and normally in resilient, frictional engagement with the external surface thereof, said shell cylindrical portion overlying both of said springs, said springs being wound in a common direction and having their adjacent ends disposed in facing relation and peripherally spaced apart by a dimension less than the peripheral dimension of said opening through said shell cylindrical portion, and said springs having their remote ends anchored on said shell, a manually manipulable steering element having a hub rotationally sleeved on said shell cylindrical portion and overlying said opening, and a pin fixedly carried by said hub, having a portion disposed in said opening, and having a further portion disposed between said adjacent spring ends, the first-named portion of said pin having a dimension, peripherally of said drum, less than the peripheral dimension of said opening, and the last-named portion of said pin having a dimension, peripherally of said drum, substantially equal to the normal peripheral distance between said adjacent spring ends.

6. A steering aid for vehicles comprising a bracket adapted to be fixedly mounted on a vehicle adjacent the steering post thereof, means carried by said bracket and formed to provide a generally cylindrical surface which, when said bracket is so mounted, is substantially coaxial with such steering post, an element adapted to be fixed to such a steering post for rotational movement therewith, means moving with said element and overlying at least a portion of said cylindrical surface in radially spaced relation thereto, a pair of coiled springs interposed between said cylindrical surface and said last-named means and normally in resilient, frictional engagement with said surface, said springs being wound in a common direction and having their adjacent ends disposed in facing, peripherally-spaced relation, and having their remote ends anchored on said means which overlies said surface, a manually manipulable steering element journalled for rotation about the axis of said cylindrical surface and having a limited lost-motion connection with said first-named element, and means providing a one-way operative connection between said steering element and each of said adjacent spring ends.

7. A steering aid for vehicles comprising a bracket adapted to be fixedly mounted on a vehicle adjacent the steering post thereof, a drum removably carried by said bracket and disposed, when said bracket is so mounted, in substantial coaxial, surrounding relation with the upper end of such steering post, an adapter formed with a socket adapted to be received on such post end, means for holding said adapter, when so mounted, against rotational movement relative to said post, a block having a socket non-rotationally receiving said adapter, said block having a portion projecting beyond that end of said drum remote from said bracket, a pair of coiled springs sleeved on the external surface of said drum and normally having a resilient, frictional engagement therewith, said springs being wound in a common direction and having their adjacent ends disposed in facing, peripherally-spaced relation, a sleeve journalled for rotation on said drum, rotationally fixed to said block and surrounding said springs, the remote ends of said springs being anchored on said sleeve, said sleeve being formed with an opening therethrough registering with the space between said adjacent spring ends and having a peripheral dimension exceeding said space, a manually-manipulable steering element having a hub journalled for rotation about the axis of said drum and overlying said opening, and a pin carried by said hub, penetrating said opening and entering the space between said adjacent spring ends.

8. The device of claim 7 in which said block has a journal bearing in said drum.

9. The device of claim 7 in which said hub has a journal bearing near one end on said sleeve and has a journal bearing near its other end on said drum, the intermediate portion of said hub enclosing said sleeve and said springs.

10. The device of claim 9 in which the first-named end of said hub projects axially beyond said sleeve and said block, and a cap received in and closing said hub end and housing the corresponding end of said block, said other end of said hub carrying a radially-inwardly projecting flange substantially enclosing the corresponding end of said drum.

References Cited in the file of this patent

UNITED STATES PATENTS

| | | |
|---|---|---|
| Re. 22,852 | Swift | Mar. 11, 1947 |
| 307,663 | Lane | Nov. 4, 1884 |
| 787,788 | Pinard | Apr. 18, 1905 |
| 2,458,441 | Starkey | Jan. 4, 1949 |